United States Patent [19]

Popino

[11] Patent Number: 5,215,595

[45] Date of Patent: Jun. 1, 1993

[54] OIL REMOVAL FROM ANIMALS, FISH AND BIRDS USING VISCOELASTICITY

[76] Inventor: James P. Popino, 12162 Holly Knoll Cir., Great Falls, Va. 22066

[21] Appl. No.: 873,508

[22] Filed: Apr. 24, 1992

Related U.S. Application Data

[63] Continuation of Ser. No. 742,241, Aug. 8, 1991, abandoned.

[51] Int. Cl.$^5$ ............................................. B08B 3/04
[52] U.S. Cl. .................................... 134/26; 62/1; 62/9; 119/3; 119/174; 134/34; 134/40; 210/922; 210/925; 210/690; 426/2; 252/351; 526/348.7
[58] Field of Search ............... 119/3; 134/26, 34, 40; 210/634, 638, 749, 767, 908, 925, 671, 691, 690; 424/442; 426/2, 89; 428/407; 514/762; 526/348.7; 252/357; 62/1, 8-10

[56] References Cited

U.S. PATENT DOCUMENTS

| | | | |
|---|---|---|---|
| 3,745,125 | 7/1973 | Marranci et al. | 210/925 |
| 3,793,218 | 2/1974 | Canevari | 210/749 |
| 3,869,385 | 3/1975 | Stanley et al. | 210/925 |
| 3,959,134 | 5/1975 | Canevari | 210/749 |
| 4,420,400 | 12/1983 | Weitzen | 210/925 |
| 4,469,603 | 9/1984 | Ledain et al. | 210/749 |
| 4,486,572 | 12/1984 | Kennedy | 526/348.7 |
| 4,502,962 | 3/1985 | Becker et al. | 210/749 |
| 4,758,354 | 1/1988 | O'Mara et al. | 210/925 |
| 4,837,249 | 6/1989 | O'Mara et al. | 428/407 |
| 4,874,528 | 10/1989 | Foreman et al. | 210/708 |

OTHER PUBLICATIONS

Research, International Bird Rescue Research Center, p. 7, date unknown.
BASF Oppanal Tech. Leaflet M2353e, Feb. 1981.
General Tests and Apparatus, Food Chemicals Codex, Third Edition, Food & Nutrition Board, National Research Council, National Academy Press, Washington, D.C., 1981 NAS., pp. 468-469.
Monographs, Food Chemicals Codex, Third Edition, Food & Nutrition Board, National Research Council, National Academy Press, Washington, D.C., p. 60, pp. 232-233.
Calcium, Official Monographs, National Formulary XVII, pp. 1909-1910.
Revised Standard Dispersant Toxicity Test, Federal Register, vol. 49, No. 139, Wednesday Jul. 18, 1984, pp. 29204-29207.
EPA Standard Dispersant Toxicity Tests of ELASTOL, United States Testing Company, Inc. Biological Services Division, 1415 Park Avenue, Hoboken, N.J. 07030, pp. 1-9 (1987), Apr. 1987.
Oppanol B 80, 100, 120, 150 and 200, BASF M2353, pp. 1-2, Feb. 1961.
Calcium Phosphates, Rhone-Poulenc Basic Chemicals Co., One Corporate Drive, Shelton, Conn. 06484.
COAD 10 CALCIUM STERATE NF, MATHE, The Mathe Company, P.O. Box 230, 169 Kennedy Drive, Lodi, N.J. 07644-0230.
Annual Report, The Marine Mammal Center, Sausalito, Calif. 94965, pp. 1-11 (1989-90).
Rehabilitation Procedures for Oil-Contaminated Birds, International Bird Research Center, Aquatic Park, Berkley, Calif. 94710, pp. 1-4 (1991).
F. Joshua Dein, V.M.D. et al., Rehabilitation of Oil Contaminated Birds, pp. 719-722.
Cleaning and Care of Oiled Waterfowl, Operation Rescue, American Petroleum Institute, 1801 K Street, N.W. 20006, pp. 12-15 (1972).
Alice B. Berkner, et al., Cleaning Agents for Oiled Wildlife, 1977 Oil Spill Conference, pp. 411-415, (1977).

(List continued on next page.)

Primary Examiner—Joseph W. Drodge
Attorney, Agent, or Firm—Lowe, Price, LeBlanc & Becker

[57] ABSTRACT

This invention relates to a method for removing oil from the internal and external surfaces of birds, fish and water fowl or from the internal and external surface of seals, otters and other mammals affected by hydrocarbon oil spills comprising internal or external treatment with a composition comprising a preponderance of polyisobutylene without effecting removal of natural oils of the surfaces of the birds, fish or water fowl.

15 Claims, No Drawings

OTHER PUBLICATIONS

Fletcher, Oiled Bird Treatment Notes, Office of Migratory Bird Management, U.S. Fish and Wildlife Service, pp. 1–4, Feb. 1978.

Williams, Saving Oiled Seabirds, International Bird Rescue Research Center, Aquatic Park, Berkley, Calif. 94710 pp. 1–35.

Bayer, Oiled Birds: How to Search for and Capture Oiled Birds at Oregon Intertidal Areas, Studies in Oregon Ornithology No. 5, Gahmken Press, P.O. Box 1467, Newport, Ore. 97365, pp. 1–29, (1988).

Williams, Saving Our Seabirds, International Bird Rescue Research Center, Berkeley, Calif., pp. 1–40.

Emil P. Dolensek, D. V. M., et al., A Step-by-Step Manual for the Care and Treatment of Oil-Damaged Birds, Animal Kingdom Magazine, New York Zoological Society, Bronx, N.Y. 10460, pp. 1–39 (1977).

The Effects of Oil on Birds, The Wetlands Institute, Stone Harbor, New Jersey, pp. 1–17 (1982).

Background Information, International Bird Rescue Research Center, Aquatic Park, Berkeley, Calif. 94710 pp. 1–4 (1991).

Heubeck, et al., Effects of the 'Esso Bernicia' oilspill (Dec. 1978) on the wintering populations of diving seabirds in Sullom Voe, Shetland, pp. 115–129.

Jenssen, et al., Rehabilitation of Oiled Birds: a Physiological Evaluation of Four Cleaning Agents, Marine Pollution Bulletin, vol. 20, No. 10, pp. 509–512, 1989.

Jenssen, et al., A Method for Evaluating the Cleaning of Oiled Seabirds, Wild Soc. Bull. vol. 16, pp. 213–215 (1988).

Jones, Handling Small Numbers of Oiled Birds, pp. 154–159.

J. A. Serafin, Ph.D., Nutrition and Disease Relationships That May Serve as Models for Feeding Oiled Birds, pp. 167–177.

OIL REMOVAL FROM ANIMALS, FISH AND BIRDS USING VISCOELASTICITY

This application is a continuation of application Ser. No. 07/742,241, filed Aug. 8, 1991, now abandoned.

TECHNICAL FIELD

This application relates to removal of hydrocarbon from the external surfaces of birds and water fowl or from the internal and external surfaces of seals, otters and other mammals.

One of the major casualties of hydrocarbon oil spills is the resident and migrating populations of birds, mammals, and fish (wild life) which come in contact with and swallow the oil.

Traditional cleanup of contaminated wild life is very slow and laborious. It usually employs the use of soapy liquids (externally) for the oil contacted externally and stomach pump devices (internally) for the swallowed oil.

In addition to being very slow and laborious, the rinsing process introduces destructive consequences upon the wild life by removing their natural body oils which are needed to survive or function efficiently in the water. Additionally, stomach pumps are difficult to apply, often ineffective and sometimes destructive to the wildlife being treated.

Much work has been done in the clean-up of hydrocarbon spills on water. For example, the following documents are described.

U.S. Pat. No. 4,758,354 to O'Mara et al issued Jul. 19, 1988, relates to a method for separating liquids, particularly hydrocarbons from water, whereby a small amount of high molecular weight polymers dissolved in a hydrocarbon to render it viscoelastic. The hydrocarbon layer is then mechanically removed. The polymer is applied to the surface of the hydrocarbon as droplets of a relatively concentrated polymer solution or as solid particulates having a polymer core covered by a powdered solid material which is non-reacted towards the polymer.

U.S. Pat. No. 4,874,528 to Foreman et al relates to the clarification of dispersions of oil and similar liquids in water with separation of oil and water phases by mixing the dispersion with a polymer dissolved in an oil miscible solvent in a manner such that contact between the polymer solution and the dispersed oil droplets is achieved. The oil in water phases are separated by settling and decantation or by enhanced phased separation techniques such as centrifugation.

U.S. Pat. No. 4,837,249 to O'Mara et al relates to a particulate, free flowing and rapid dissolving polymer composition prepared by comminuting a high molecular weight thermoplastic or viscoelastic polymer at a temperature below its glass transition temperature while maintaining the polymer in an inert environment. A coating agent forms a protective shell around each polymer particle by tumble mixing the components while raising the temperature of the mixture.

U.S. Pat. No. 4,420,400 to Weitzen issued Dec. 13, 1983 relates to conversion of spilled liquid hydrocarbon products ranging from crude oil to refined fractions and discreet compounds by converting such products from a liquid to a gel or to a semi-solid or solid state by contacting the liquid petroleum product with a slurry of chronogenically comminuted polymer particles in a liquified refrigerant gas. This is to clean up oil spills.

None of the above techniques have been applied to the clean-up of birds, mammals and fish which have come in contact with the oil. The above listed methods regarding soapy liquids and stomach pump devices have been utilized to clean up the wild life and birds.

Accordingly, there is a need in this art for an effective and simple cleanup procedure for removing oil from the internal and external surfaces of birds and water fowl or from the internal and external surface of seals, otters and other mammals effected by the hydrocarbon oil spills.

DISCLOSURE OF THE INVENTION

An object of the invention is to provide a method for removing oil from the external surfaces of birds and water fowl or from the external surfaces of seals, otters and other mammals by the external application of a solvation agent which has been dissolved in a low volatile solvent and sprayed upon the bird, water fowl or animal and than washed off with water.

Particularly preferred is an object of the invention whereby the process according to the invention will not remove the animal's natural oil and will only bond to the petroleum products, thereby allowing it to be easily rinsed from the animal.

Another object of the invention relates to a method for removing oil from the intestines and other internal areas of birds, water fowl, mammals and fish by the internal application of a solvation agent. A particularly preferred object of the invention is a method according to the invention wherein the solvation agent can optionally be mixed with a laxative material and fed to the bird, animal or fish to enable them to remove the petroleum with their body waste.

BRIEF STATEMENT OF THE INVENTION

The present invention provides a method for removing oil from the internal and external surfaces of birds, fish and water fowl or from the internal and external surfaces of seals, otters and other mammals effected by the oil spills comprising treatment with a composition comprising a preponderance of polyisobutylene.

The present invention further provides a method for removing oil from the external surfaces of birds, fish, water fowl, seals, otters and other mammals, wherein the method comprises (a) The externally applying an effective amount of a non-toxic polymer composite having food grade additive quality and comprising about 80% by weight of polyisobutylene contained in a low volatile organic solvent;

(b) Permitting the oil and composition to bond to form a viscous, cohesive, elastic-like composition without substantially effecting the natural oils of said bird, fish, water fowl, seals, otters or other mammals; and (c) washing the resulting composite/oil from the birds, fish, water fowl, seals, otters or other mammals to remove the oil.

The present invention also provides a method according to the present invention for treating internal oil contamination of birds, fish, water fowl, seals, otters and other mammal by internaly treating birds, fish, water fowl, seals, otters and other mammals with an effective amount of a composition comprising polyisobutylene (PIB), allowing the oil to bind with the composition and then allowing the oil/composition to be passed through the digestive system of the birds, fish, water fowl, seals, otters and other mammals as waste.

In a preferred embodiment of this invention, the composition comprising PIB is a composition formed by a method comprising freezing the polyisobutylene containing material to below about −100° C. followed by coating the glassy fine powder with calcium stearate.

DESCRIPTION OF THE INVENTION

The cleanup methods according to the present invention employ the use of viscoelasticity (the property given to oil by a substance which absorbs or bonds to the oil to yield an elastic, viscous and cohesive substance) to remove the petroleum oil from the:

primary and secondary feathers of birds, intestines and other internal areas of birds, mammals, and fish, external coatings of Seals, Otters, and other mammals.

The external application process according to the present invention employs an effective amount of a composition which comprises a preponderance of polyisobutylene (PIB). The composition comprising PIB is dissolved in a low volatile organic solvent (e.g., Exxon's Isopar, which is an isoparaffinic solvent), sprayed upon the wild life and then washed off with an aqueous solution, e.g., water. In a preferred embodiment the composition comprising PIB is ELASTOL® (a patented product of General Technology Applications, Inc. of Manassas, Va. (U.S. Pat. No. 4,758,354). The disclosure of U.S. Pat. No. 4,758,354 is hereby incorporated herein by reference.

ELASTOL® is a composition comprising PIB. It is a non-toxic polymer (food grade additive) composite consisting of about 80% PIB. It is produced by freezing the material to temperatures below −100° C. and then coating the glassy fine powder with calcium stearate. When applied to hydrocarbon spills on water and other surfaces, ELASTOL® retards spreading, emulsification and dispersion, increases the viscoelasticity of the oil thus dramatically improving containment, removal, recovery and cleanup as described in U.S. Pat. No. 4,758,354.

According to the external treatment method of this invention, it has been unexpectedly discovered that petroleum oils on the external surfaces of wild life can be removed by applying a composition comprising PIB in a slurry form which causes the petroleum oils to bond or otherwise form a mixture with compositions. Petroleum oils bonded with the PIB composition acquire properties which allow them to be washed off the surface by water. It has been discovered that the bonded petroleum oils have much less adhesion to wild life external surfaces and will wash away in much the same way as loose dust and dirt is washed from a hard surface.

More particularly, the method relates to treatment with a composition comprising a non-toxic polymer composite having food grade additive quality and comprising about 80% by weight of polyisobutylene. Even more preferred is a method wherein the treatment is with a composition formed by a method comprising freezing the polyisobutylene containing material to below about −100° C. followed by coating the glassy fine powder with calcium stearate.

Surprisingly, the method according to the present invention will substantially not remove the wild life's natural oil such as from secondary feathers since the ELASTOL® will only bond substantially with the petroleum product from the oil spill when applied to external surfaces. After adequate bonding has occurred, the ELASTOL®/oil mixture complex is then easily rinsed from the contaminated wild life.

The external method according to the invention more particularly provides for a method wherein the composition is sprayed upon the external surfaces of the birds, fish, water fowl, seals, otters or other animals and the solution used to wash the composite/oil off is an aqueous solution.

The internal oil contamination treatment method according to the present invention also employs an effective amount of a composition comprising polyisobutylene (PIB). The composition comprising PIB is mixed with a material that is palatable to the wild life and the mixture is then fed to the wild life. The mixture bonds substantially with the petroleum product that is internally contaminating the wild life. After adequate bonding has occurred, this bonded mixture is removed with body waste of the wild life.

In a preferred embodiment of this invention, the composition comprising PIB is ELASTOL® which is mixed with a material that is palatable to the wild life and the mixture is then fed to the wild life.

In an even more preferred embodiment of the present invention, a laxative material that is palatable to the wild life is also fed to the wild life having internal oil contamination. A laxative material speeds up the elimination of body waste and the internally bonded PIB composition/oil complex from the digestive system of the wild life. Adding a laxative material to the internal treatment method has an additional advantage. It allows the wild life to more quickly return to its normal foraging for food and digestion of the food consumed.

EXAMPLE 1

A quantity of high molecular weight polyisobutylene, designated as Oppanol B234 by the supplier, BASF, was obtained. The polymer was in the form of generally cubic chunks about 1 cm of a side and had been mixed with about 10% by weight of powdered tricalcium phosphate to keep the polymer chunks from sticking together.

The polyisobutylene chunks were fed, together with sufficient additional tricalcium phosphate (TCP) to form a 85-15 by weight mixture of the two components, into a cryo-chiller cooled with liquid nitrogen. The cyro-chiller discharged into a hammer mill, which was cooled with additional liquid nitrogen and equipped with an 0.062 inch, round-holed screen. The comminuted mixture of polyisobutylene and TCP was collected cold and maintained under a protective atmosphere of nitrogen. The mixture was then re-ground using the same hammer mill but equipped with a 0.013 inch herringbone screen. Again the re-ground mixture was collected cold and maintained under nitrogen.

The TCP was obtained from the Stauffer Chemical Company, was anhydrous having the chemical formula $3Ca_3(PO_4)_2 \cdot Ca(OH)_2$, had a bulk density of approximately 20 lb/ft$^2$, and had a median particle size of less than about 1 micrometer as observed by electron microscopy.

The ground mixture, comprising about 85-15 by weight mixture of PIB to TCP and weighing about 300 kg, was then transferred while cold and under a nitrogen atmosphere into a large, uninsulated, V-blender. The blender was rotated for about 20 minutes while the contents were warmed by means of heat transfer through the blender shell. At the end of that time, the blender contents had warmed to near ambient temperature and were free flowing, homogeneous and granular in appearance. The contents were packaged in plastic bags.

EXAMPLE 2

A quantity of Example 1 polymer composition was placed into a V-type blender having a separately rotating intensifier bar therein. As the blender rotated, water was introduced through ports in the intensifier bar until a total of water amounting to about 3% by weight of the polymer composition had been added. A quantity of finely powdered calcium stearate amounting to about 3% by weight of the polymer composition, was then added to the blender mixture. The blender was then rotated for a few minutes and the contents were examined. It was found that the calcium stearate had been dispersed as a coating over the surfaces of the particles. Screen analysis showed a major fraction of the agglomerates to be about 40 mesh.

EXAMPLE 3

A quantity of the composition of Example 2 is added to a quart of low volatility isoparafinic solvent having a mid-boiling point of 382 degrees centigrade (ISOPAR L solvent, Exxon Chemical Co., U.S.A.) sufficient to yield a 20% by weight solution of composition in the solvent, which is a concentrate composition.

EXAMPLE 4

The quart of concentrate solution from Example 3 is shaken briefly before use. It is applied to the oil surface on the twenty-five water fowl using an eductor attached to a pressurized tank of low volatility isoparafinic solvent (as set forth in Example 3, above) or a water hose apparatus. A ratio of concentration solution to diluent solvent from 1% to 10% is effective. After about 10-30 minutes, the oil/polymer composition is bonded (becomes cohesive) and produces a stretchy, elastic-like, viscous film which adheres to itself. This film removes easily by agitation, i.e., rinsing away with pressurized water agitation or removing by manual agitation such as rubbing.

EXAMPLE 5

The procedure of Example 4 is duplicated for treating birds and mammals such that from 100 ppm (0.01%) to 3000 ppm (0.30%) proportionate to the oil on the surfaces of the animals or birds may be applied. The higher density oils requiring less parts per million than the thinner more volatile oils.

EXAMPLE 6

A quantity of the composition of Example 3 is added to a quart of water in an amount sufficient to yield a 20% by weight solution of composition in the water to provide a slurry concentrate composition.

EXAMPLE 7

The quart of concentrate solution from Example 6 is shaken briefly before use. It is applied to the oil on the surface of 20 fish weighing from about one to about five pounds using an eductor attached to a pressurized water. A ratio of concentrate solution to water from 1% to 20% is effective. The fish are maintained by pumping water through their mouths and out through their gills. After about 5-10 minutes, the oil/polymer composition is bonded (becomes cohesive) and produces a stretchy, elastic-like, viscous film which adheres to itself. This film removes easily by agitation, i.e., rinsing away with pressurized water agitation or removing by manual agitation such as rubbing.

EXAMPLE 8

A quantity of the composition of Example 2 is added to powdered foodstuffs (different foodstuffs for the fish, birds/water fowl and mammals) to yield foodstuff compositions comprising from about 0.01% to about 10% by weight of the composition of Example 2.

EXAMPLE 9

The corresponding foodstuffs of Example 8 are feed to fish, birds/water fowl and mammals in place of their regular foodstuffs for one to five days. The fish, birds/water fowl and mammals are then allowed to pass the adhered oil/polymer composition with their waste. The treatment with the oil removing foodstuffs may be repeated until their waste is substantially free of oil.

I claim:

1. A method for removing oil-spill oil from an external surface of a bird, or water fowl, affected by an oil spill comprising external treatment with a composition comprising polyisobutylene.

2. A method according to claim 1, wherein said composition is a non-toxic polymer composite having food grade additive quality and comprising about 80 percent by weight of polyisobutylene.

3. A method according to claim 2, wherein said composition is formed by a method comprising freezing the polyisobutylene to below about −100° degrees centigrade to provide said polyisobutylene in the form of a glassy fine powder, followed by coating the glassy fine powder of said polyisobutylene with calcium stearate.

4. A method according to claim 2, for removing said oil-spill oil from an external surface of a bird or water fowl, wherein said method comprises
   (a) amount of a non-toxic polymer composite having food grade additive quality and comprising about 80% by weight of polyisobutylene contained in a low volatile organic solvent effective to bond with said oil spill oil;
   (b) Permitting said oil-spill oil and composition to bond to form a viscous, cohesive, elastic-like composite consisting of said oil-spill oil and said composition, without substantially effecting removal of natural oils of said bird or water fowl; and
   (c) washing said composite from said bird or water fowl to remove the oil-spill oil.

5. A method according to claim 4, wherein said method further comprising;
   (a) spraying said composition in said solvent upon an external surface of said bird or water fowl;
   (b) allowing said composite to form; and
   (c) washing off said composite with an aqueous solution.

6. A method for removing oil-spill oil from an external surface of a seal or otter affected by an oil spill comprising external treatment with a composition comprising polyisobutylene.

7. A method according to claim 6, wherein said composition is a non-toxic polymer composite having food grade additive quality and comprising about 80 percent by weight of polyisobutylene.

8. A method according to claim 7, wherein said composition is formed by a method comprising freezing the polyisobutylene to below about −100 degrees centigrade to provide said polyisobutylene in the form of a glassy fine powder, followed by coating the glassy fine powder of said polyisobutylene with calcium stearate.

9. A method according to claim 7, for removing said oil-spill oil from an external surface of a seal or otter, wherein said method comprises
   (a) Applying to said external surface an amount of a non-toxic polymer composite having food grade additive quality and comprising about 80% by weight of polyisobutylene contained in a low volatile organic solvent effective to bond with said oil spill oil;
   (b) Permitting said oil-spill oil and composition to bond to form a viscous, cohesive, elastic-like composite consisting of said oil-spill oil and said composition, without substantially effecting removal of natural oils of said seal or otter; and
   (c) washing said composite from said seal or otter to remove the oil-spill oil.

10. A method according to claim 9, wherein said method further comprising;
   (a) spraying said composition in said solvent upon an external surface of said seal or otter;
   (b) allowing said composition to form; and
   (c) washing off said composite with an aqueous solution.

11. A method for removing oil-spill oil from an external surface of a fish affected by an oil spill comprising external treatment with a composition comprising polyisobutylene.

12. A method according to claim 11, wherein said composition is a non-toxic polymer composite having food grade additive quality and comprising about 80 percent by weight of polyisobutylene.

13. A method according to claim 12, wherein said composition is formed by a method comprising freezing the polyisobutylene to below about −100 degrees centigrade to provide said polyisobutylene in the form of a glassy fine powder, followed by coating the glassy fine powder of said polyisobutylene with calcium stearate.

14. A method according to claim 12, for removing said oil-spill oil from an external surface of a fish, wherein said method comprises
   (a) Applying to said external surface an amount of a non-toxic polymer composite having food grade additive quality and comprising about 80% by weight of polyisobutylene contained in a low volatile organic solvent effective to bond with said oil spill oil; (b) Permitting said oil-spill oil and composition to bond to form a viscous, cohesive, elastic-like composite consisting of said oil-spill oil and said composition; and
   (c) washing said composite from said fish to remove the oil-spill oil.

15. A method according to claim 14, wherein said method further comprising;
   (a) spraying said composition in said solvent upon an external surface of said fish;
   (b) allowing said composite to form; and
   (c) washing off said composite with an aqueous solution.

* * * * *